(12) United States Patent
Davies et al.

(10) Patent No.: US 7,969,755 B2
(45) Date of Patent: Jun. 28, 2011

(54) APPARATUS FOR ELECTRICAL POWER TRANSMISSION

(75) Inventors: Mark Davies, Howrah (AU); Jörg Dorn, Buttenheim (DE); Hartmut Huang, Erlangen (DE); Dietmar Retzmann, Höchstadt (DE)

(73) Assignee: Siemens Aktiengesellschaft, Munich (DE)

( * ) Notice: Subject to any disclaimer, the term of this patent is extended or adjusted under 35 U.S.C. 154(b) by 582 days.

(21) Appl. No.: 12/066,320

(22) PCT Filed: Sep. 9, 2005

(86) PCT No.: PCT/DE2005/001601
§ 371 (c)(1),
(2), (4) Date: Mar. 10, 2008

(87) PCT Pub. No.: WO2007/028349
PCT Pub. Date: Mar. 15, 2007

(65) Prior Publication Data
US 2008/0205093 A1   Aug. 28, 2008

(51) Int. Cl.
*H02J 3/26* (2006.01)
(52) U.S. Cl. .......................................... 363/35
(58) Field of Classification Search ............. 363/34, 363/35, 37, 123, 131
See application file for complete search history.

(56) References Cited

U.S. PATENT DOCUMENTS

| | | | | |
|---|---|---|---|---|
| 4,780,802 A | * | 10/1988 | Miyashita et al. | 363/37 |
| 4,816,985 A | * | 3/1989 | Tanahashi | 363/81 |
| 4,894,763 A | * | 1/1990 | Ngo | 363/35 |
| 5,198,746 A | | 3/1993 | Gyugyi et al. | |
| 5,198,970 A | * | 3/1993 | Kawabata et al. | 363/37 |
| 5,726,550 A | * | 3/1998 | Inaniwa et al. | 318/803 |
| 6,204,627 B1 | * | 3/2001 | Watanabe et al. | 318/729 |
| 6,278,626 B1 | | 8/2001 | Teichmann | |

(Continued)

FOREIGN PATENT DOCUMENTS

DE   19850886 A1   5/2000

(Continued)

OTHER PUBLICATIONS

Knudsen et al: "Description and Prospective Applications of New Multi-Terminal HVDC System Concepts", CIGRE Conf. Internationale des Grands Reseaux Electriques, Aug. 26, 1990, pp. 1-11, XP000770178.

*Primary Examiner* — Adolf Berhane
(74) *Attorney, Agent, or Firm* — Laurence A. Greenberg; Werner H. Stemer; Ralph E. Locher (57) ABSTRACT

A device for the transmission of electrical energy includes at least one current converter. Each current converter has phase elements with respective arrangements of circuit elements that comprise at least two switchable power semiconductors each and at least two free-wheeling diodes, each connected in parallel thereto, and energy storing means. The transfer properties in or between power distribution networks are improved with the novel device. The device is provided with means for controlling the current converter in such a manner that the zero crossing, the amplitude and/or the instantaneous values of an alternating current of a transfer network that can be connected to the device and/or the direct current of a direct current line that connects at least one current converter to a direct current source, and/or the direct voltage and the direct current of at least three interconnected current converters can be controlled.

23 Claims, 3 Drawing Sheets

U.S. PATENT DOCUMENTS

| | | |
|---|---|---|
| 6,621,723 B1 | 9/2003 | Karasawa et al. |
| 7,135,835 B2 * | 11/2006 | Yamada et al. ............... 318/800 |
| 7,142,439 B2 * | 11/2006 | Oh ................................. 363/37 |
| 7,274,576 B1 * | 9/2007 | Zargari et al. .................. 363/39 |
| 7,388,353 B2 * | 6/2008 | Kato et al. .................... 320/166 |
| 7,471,525 B2 * | 12/2008 | Suzuki et al. ................... 363/37 |
| 7,480,160 B2 * | 1/2009 | Bakran et al. ................... 363/37 |
| 7,499,296 B2 * | 3/2009 | Baudesson et al. ............. 363/37 |
| 7,609,022 B2 * | 10/2009 | Oyobe et al. ................. 318/800 |
| 2008/0068870 A1 * | 3/2008 | Eguchi et al. ................... 363/37 |

FOREIGN PATENT DOCUMENTS

| | | |
|---|---|---|
| DE | 10103031 A1 | 7/2002 |
| DE | 10323220 A1 | 12/2004 |
| EP | 1087512 A2 | 3/2001 |
| WO | 0028636 A2 | 5/2000 |
| WO | 2004082115 A1 | 9/2004 |

* cited by examiner

APPARATUS FOR ELECTRICAL POWER TRANSMISSION

BACKGROUND OF THE INVENTION

Field of the Invention

The invention relates to an apparatus for electrical power transmission having at least one converter, with each converter having phase elements which each have an arrangement of switching elements which each comprise at least two power semiconductors which can be switched off and at least two freewheeling diodes, which are respectively connected in parallel with them, and energy storage means.

Known apparatuses of this generic type have, for example, two converters which are connected on the DC voltage side, in order to transmit electrical power between two electrically isolated, asynchronous or, connected to one another, synchronous AC voltage power supply systems, and to specifically control this transmission. Open-loop control such as this is necessary since, for example, local overloads or unbalanced load distributions can occur in AC voltage power supply systems. The overload can then be compensated for by the controlled power transmission. These and a series of other apparatuses are referred to as so-called HVDC installations and FACTS. Converters in these HVDC installations and FACTS use power semiconductors, such as thyristors, which use line-commutated technology, or power semiconductors which can be switched off, for example so-called insulated gate bipolar transistors (IGBT), which are used for self-commutated topologies. So-called voltage sourced converters (VSC) with power semiconductors which can be switched off require a temporary energy store, generally a capacitor. Arrangements with self-commutated converters and a capacitor as a temporary energy store have the disadvantage that the transmission power is limited by the size of the capacitor that is used. In the event of a fault, an extremely high short-circuit current can lead to destruction of the installation. Until now, only transmission voltages of up to about ±150 kV and transmission power levels of about 300 to 500 Megawatts have therefore been achieved in practice with an arrangement such as this.

DE 101 03 031 A1 discloses a converter arrangement for power supply system couplings which, instead of an intermediate circuit capacitor, contains distributed capacitors as energy stores, which are contained in individual switching elements with power semiconductors which can be switched off, and associated freewheeling diodes.

BRIEF SUMMARY OF THE INVENTION

The object of the present invention is to design an apparatus of the type mentioned initially which improves the transmission characteristics in or between power distribution systems.

According to the invention, the object is achieved by means for controlling the converter such that the zero phase angle, the amplitude and/or the instantaneous values of an AC voltage of a transmission system which can be connected to the apparatus, and/or the DC voltage and the direct current on a DC voltage line which connects at least one of the converters to a DC voltage source, and/or the DC voltage and the direct current can be controlled by at least three converters which are connected to one another.

According to the invention, an apparatus having a converter is provided, which has a plurality of individually switchable energy storage means. The control means allow the characteristics of a converter such as this to be used in the field of power transmission and distribution, and in particular for power factor correction and for direct-current transmission, where the characteristics of a converter such as this are particularly advantageous. For example, the apparatus according to the invention is used to improve the stability of the transmission system to which the apparatus according to the invention can be connected. However, in addition to improving the power supply system stability, it is also possible to optimize the current quality of the power transmission, in which case the expression current quality in this case covers the supply reliability and the voltage quality. For this purpose, the voltage produced by the converter is connected in parallel with a transmission line of the transmission system, or is coupled to it in series, so that the load flow in the transmission system is varied as desired. Appliances for detection of the AC voltage and of the alternating current are expediently provided in the transmission system for parallel connection with accurate phases or for serial coupling of the voltage, the measured values from which appliances are supplied to a closed-loop control unit for the apparatus according to the invention which allows the converter to be controlled on the basis of a comparison of the measured values with predetermined nominal values. In addition to one or more such closed-loop control units, the control means include instruments for detection of measurement variables, software running on the closed-loop control unit or units, communication devices and the like. Controllable variables for closed-loop control include, for example, the AC voltage and/or the alternating current in the transmission system. The transmission system has one or more phases. For the purposes of the claimed invention, an AC voltage should be understood as meaning not only a variable at the fundamental frequency but also a voltage profile which varies in any given manner over time. For example, in the case of essentially sinusoidal AC voltages, the zero phase angle and amplitude of the AC voltage of the transmission system are preferably controlled. The instantaneous values of the AC voltage are preferably used to control other time profiles of the AC voltage, and these could also be referred to as instantaneous values. The expression zero phase angle means the phase difference between the AC voltage and a reference variable which is dependent on the respective requirements applicable to the apparatus according to the invention. The alternating current in the transmission system at the connection point is therefore mentioned here just by way of example as a reference variable.

The converter can be connected to a DC voltage source as well, via a DC voltage line. By way of example, the DC voltage source is a further converter. Both converters then operate as converters that are connected to one another on the DC voltage side in a direct-current transmission installation, with the controlled variables being the DC voltage and/or the direct current on the DC line and/or the AC voltage in the transmission system. The DC voltage and the direct current are, for example, detected at each converter and are supplied to a control unit associated with each of the converters. The closed-loop control makes it possible to determine the power, and/or the wattless component and/or their respective proportions, to be transmitted. Where converters are positioned at a distance from one another, the nominal parameters are transmitted by expedient remote data transmission between the converters. The converters in a direct-current remote transmission installation such as this may advantageously be positioned several kilometers away from one another.

For the purposes of the invention, a back-to-back link is also claimed for power transmission and distribution, having at least three converters. An apparatus such as this is also referred to as a multiterminal back-to-back link. In this case, by way of example, the converters are connected to one another directly, that is to say without a DC line, with direct current and DC voltage being detected at the respective converter or at just one measurement point.

The design and operation of the switching elements are described in DE 101 03 031 A1, which is hereby referred to as an integral part of the present disclosure. An apparatus such as this has the advantage that the stored energy is distributed between a multiplicity of respectively smaller energy storage means, so that the voltage and power restriction when using a single energy storage means, for example a capacitor, is overcome. Furthermore, the distributed energy storage means allow finer graduation of the voltage produced by the converter in comparison to apparatuses with just one common energy store, thus reducing the complexity for smoothing and filtering at the apparatus connecting point. For example, this considerably simplifies the coupling of the converter to the transmission system. The invention avoids the need for complex magnetic coupling measures, for example by connecting transformer windings in series. Furthermore, the invention ensures better operational reliability since, if a single switching element fails, for example as a result of a short circuit, the other switching elements are still fully operational. The individual switching elements of a phase element act like controllable voltage sources, and have three possible states. In a first state, the terminal voltage of the switching element is equal to the capacitor voltage. In a second state, the terminal voltage of the switching element is approximately equal to zero, apart from the forward voltage across the power semiconductor which can be switched off or the freewheeling diode, with a third state being provided for the defect situation.

According to the invention, the apparatus is of modular design. The modular design is achieved by phase elements which are in turn subdivided into switching elements. The switching elements are either identical and in particular have identical energy storage means, and therefore provide the same storage capacity. In contrast to this, however, it is also possible to use combinations with different capacitance configurations within the scope of the invention.

In one expedient further development of the invention, the switching elements of one phase element are connected in series, with an even number of switching elements being provided, and a load or power supply system connection is arranged centrally on the series circuit formed by the switching elements. The series connection of a plurality of switching elements and an appropriate drive for the individual switching elements allow an even more finely graduated voltage output. A central load or power supply system connection means that the switching elements on one side of the series circuit are, for example, in a first state as described further above and the switching elements on the other side are in the second state, likewise as described above, or vice versa. These drives result in maximum voltage values on the phase element. If one or more switching elements on the respective sides are switched to the second state, this results in the voltage being graduated with increments equal to the voltage on the individual switching elements.

However, phase elements with an odd number of switching elements and/or phase elements with a non-central load or power supply system connection are likewise possible within the scope of the invention. For example, the individual switching elements are designed for equal or unequal voltages and are expediently graduated differently, in a binary form or some other form, thus allowing finer graduation with the same number of switching elements than if the design were based on equal voltages.

In one further development, the phase element comprises an arrangement with two parallel branches, each having an even number of switching elements connected in series. The connection of two branches in parallel, each having a series circuit formed by switching elements, further increases the fineness of the graduation of the voltage which can be generated by the converter.

According to one further development that is expedient in this context, at least two parallel branches are connected to one another by means of a transformer winding. In contrast to this, at least two parallel branches are galvanically connected to one another via a parallel branch connection. The galvanic connection by means of a parallel branch connection allows a low-cost transformer design, which is used to connect the apparatus according to the invention to a transmission system and/or to a DC voltage line.

In one expedient development, a plurality of phase elements of a converter are connected in parallel with one another. In this case, the phase elements form a bridge circuit. The converter acts like a so-called voltage sourced converter (VSC), which is known per se, and can therefore advantageously be connected to the transmission system in order to input a controllable polyphase AC voltage for the wattless component and/or power. In this case, the converter generates a polyphase AC voltage. The control means can be used to selectively influence the zero phase angle and/or the amplitude of the AC voltage to be fed into the transmission system, to be precise independently of one another. A converter such as this can therefore, for example, also be used as an active filter element instead of or combined with passive filters, such as RC elements, for active filtering of voltage distortion in the frequency range below and/or above the power supply system frequency (subharmonic, super-subharmonic) and/or to compensate for unbalanced voltages. In this case, a voltage input from the converter is such that the voltage discrepancies from a sinusoidal shape are cancelled out, for example, by negative interference.

Furthermore, a voltage sourced converter such as this can also be used as a converter for direct-current transmission. The converter then comprises, for example, three phase elements which are connected in parallel with one another in a known bridge circuit. An arrangement with two phase elements connected in parallel also offers a simple option for providing a converter for direct-current transmission for connection to a transmission system with just one single phase, for example via a coupling transformer, or to a transmission system having a plurality of phases. The expression direct-current transmission, for the purposes of the invention, covers both high-voltage direct-current transmission (HVDC transmission) and medium-voltage direct-current transmission (MVDC transmission) as well as low-voltage direct-current transmission (LVDC transmission).

In another embodiment, a plurality of phase elements are connected in series with one another. The phase elements are advantageously connected in series with one another with two parallel branches, each having a plurality of switching elements. An arrangement such as this likewise acts as a voltage sourced converter and, for example, can act as a converter in a direct-current transmission installation. In this case, the series circuit allows transmission at a higher DC voltage for a predetermined power level, that is to say with a lower current and therefore with reduced losses.

In one advantageous development, energy storage means are arranged in parallel with the phase elements. Additional energy storage means such as these are used for further smoothing and stabilization.

In a further refinement, each phase element has at least one impedance, or is connected to another phase element via at least one impedance. Impedances such as these, in the simplest case in the form of coils, advantageously limit any circulating current which may occur between the individual phase elements for example as a result of voltage fluctuations or unbalanced voltages. In addition, the impedances can be designed such that the rate of current rise and/or the current amplitude are/is limited in the event of malfunctions. In this case, by way of example, the impedance is connected in series either with the phase element or with individual switching elements of a phase element, or is integrated in the switching element, for example with an advantageous modular configuration.

In one preferred embodiment, at least one converter can be connected in parallel with the transmission system. An arrangement such as this is used for so-called parallel compensation for control of the wattless component and/or power and, for example, carries out dynamic control functions in order to damp out undesirable power fluctuations and/or subsynchronous resonances and/or subharmonics or super-subharmonics. The advantageous further development is also used, for example, for voltage balancing.

One particularly advantageous feature of the apparatus that has been further developed according to the invention over known parallel compensation apparatuses is that the series connection of the switching elements as already described above makes it possible to input an AC voltage which can be finely graduated into the transmission line, with the energy to produce the AC voltage being stored in the distributed energy storage means in the individual switching elements, in contrast to known apparatuses in which a single capacitor is used as the energy store and, because of its size, acts as a limiting element for the transmission voltage and power of the apparatus. The apparatus according to the invention with energy storage means in each switching element therefore makes it possible to set the voltage to be fed in more finely.

In a further refinement, at least one converter can be connected in series with a transmission system. A connection such as this is likewise used to control the wattless component and/or power in the transmission system, including the already described dynamic control functions, by active connection and/or inputting of a voltage whose magnitude and/or phase are dynamically variable. The apparatus according to the invention advantageously has a plurality of converters, one of which is connected in parallel with the transmission system, while the other is connected in series with it. The wattless component and/or the power in the transmission system are controlled, or else the dynamic control functions as described above are carried out in an improved manner by actively inputting two voltages whose magnitude and/or phase are dynamically variable. By way of example, the transmission system is a single-phase or a polyphase transmission line.

In another embodiment, the DC voltage source is a second converter. The second converter may in this case act as a rectifier, with the direct current being passed via the DC voltage line to the first converter. The first converter or, to be more precise, the inverter, is then used to convert a DC voltage to an AC voltage. However, the operation of the converter as a rectifier or inverter is freely variable.

At least part of the DC voltage line is a gas-insulated transmission line, a cable and/or an overhead line. Combinations of these lines are, of course, also possible within the scope of the invention. The particular advantage of a gas-insulated transmission line, GIL, over a cable, even in combination with an overhead line, is the capability to cope better with dynamic control and protection functions on the basis of the reduced charge capacitance of the gas-insulated line. An apparatus according to the invention that has been developed further in this way is used, for example, for remote direct-current transmission, in order to produce a DC voltage by means of a first rectifier from single-phase or polyphase AC voltages. The DC voltage is transmitted to the second converter or inverter. The DC voltage transmission in principle takes place by means of DC voltage line of any desired configuration.

One advantageous feature when using a converter according to the invention with three phase elements connected in parallel to one another is that no energy storage means need be connected to the DC voltage line on the DC voltage side since the individual switching elements of the phase elements themselves have energy storage means which are used not only as energy stores but also for voltage smoothing on the DC voltage side. The use of three phase elements connected in parallel with one another in the second converter makes it possible, by means of the switching elements with energy storage means, to produce a polyphase AC voltage which can be graduated more finely, for example for feeding into an AC voltage power supply system that is connected.

DC voltage transmission installations with more than two converters, that is to say so-called multiterminals, are, of course, also feasible within the scope of the invention. In the case of multiterminals, that is to say direct-current transmission installations with at least three converters, the DC voltage line is optional for the purposes of the invention. In other words, in one variant with at least three converters which are linked to one another on the DC voltage side, the invention covers not only a remote direct-current transmission installation but also a back-to-back link.

In one expedient refinement, the first or the second converter is formed by line-commutated power semiconductors. The embodiment of the apparatus with one converter which, for example, has a bridge circuit formed by line-commutated power semiconductors, for example thyristors or in the simplest case also diodes instead of the power semiconductors which can be switched off, makes it possible to reduce the installation costs.

In one expedient further development, the DC voltage line has one or two poles. Two-pole DC voltage lines allow power levels to be transmitted. Single-pole DC voltage lines which feed the direct current back via the ground or, in the case of underwater cable connections through the water, lead to low-cost apparatuses. Single-phase or two-phase transmission power supply systems on the alternating-current side of the remote direct-current transmission installation according to the invention allow connection to special power supply systems, for example for railroad supply. DC voltage lines with a plurality of poles are, of course, also possible within the scope of the invention.

In a further embodiment of this further development, the DC voltage line is formed by an impedance, in the simplest case a coil. By way of example, a so-called back-to-back link, which is known per se, can be formed by a coil as a DC voltage line, with the coil carrying out functions such as smoothing, current limiting and/or rise gradient limiting.

In one expedient refinement, a further diode is connected in parallel with each of the switching elements. A further diode such as this, for example a pressure-contact diode that is known per se, such as a disk-cell diode or a diode integrated in a pressure-contact electronics module, can bridge a defective switching element, if appropriately driven by the control system, if one or more of the switching elements is or are faulty, thus allowing further operation of the converter. In this case, a brief overvoltage is formed deliberately across the defective switching element by suitably driving the switching elements which are still intact, resulting in breakdown of the parallel-connected diode and permanently bridging the defective switching element until it is replaced during the next servicing cycle. Furthermore, the freewheeling diode which is integrated in the power semiconductor can also have such a bridging function for the switching element in the event of a fault.

Energy storage means comprise energy stores such as batteries, a flywheel or supercaps and capacitors. The energy stores have a considerably higher energy density than capacitors. This has the advantage that the control of the wattless component and/or power, including the already described dynamic control functions, are still available even in the event of a relatively long voltage dip or failure in the transmission system or in the DC voltage line. The use of energy storage means with a high energy density results in better system availability.

At least some of the energy storage means are advantageously capacitors. Capacitors cost less than the currently known energy stores.

In one preferred embodiment, the converter is connected to the DC voltage line by means of an energy store. When using energy stores with a high energy density, a connection such as this results in better system availability. In this development according to the invention, it is also possible to use as energy stores any of the energy stores mentioned above, with the exception of supercaps. The energy stores are connected to the DC voltage line in series or in parallel.

The apparatus advantageously forms a direct-current transmission installation and/or a so-called FACTS (flexible AC transmission system) and in this case provides a finely graduated output voltage. A further advantage is that the wattless component and/or power are transmitted without complex magnetic coupling. In this case, the apparatus according to the invention is advantageously of modular design. It is particularly preferable to use the apparatus according to the invention for direct-current transmission and/or for development of a so-called static synchronous compensator (STATCOM), of a static synchronous series compensator (S3C) or a unified power flow controller (UPFC).

The invention also relates to a system having an apparatus for electrical power transmission, of the type mentioned above. In this case as well, the transmission system has one or more phases. In general, the transmission system is a three-phase line, to which the apparatus according to the invention is connected.

The invention will be described in the following text using exemplary embodiments and with reference to the figures of the drawing, in which the same reference symbols refer to components having the same effect, and in which:

DESCRIPTION OF THE INVENTION

Figure 1:
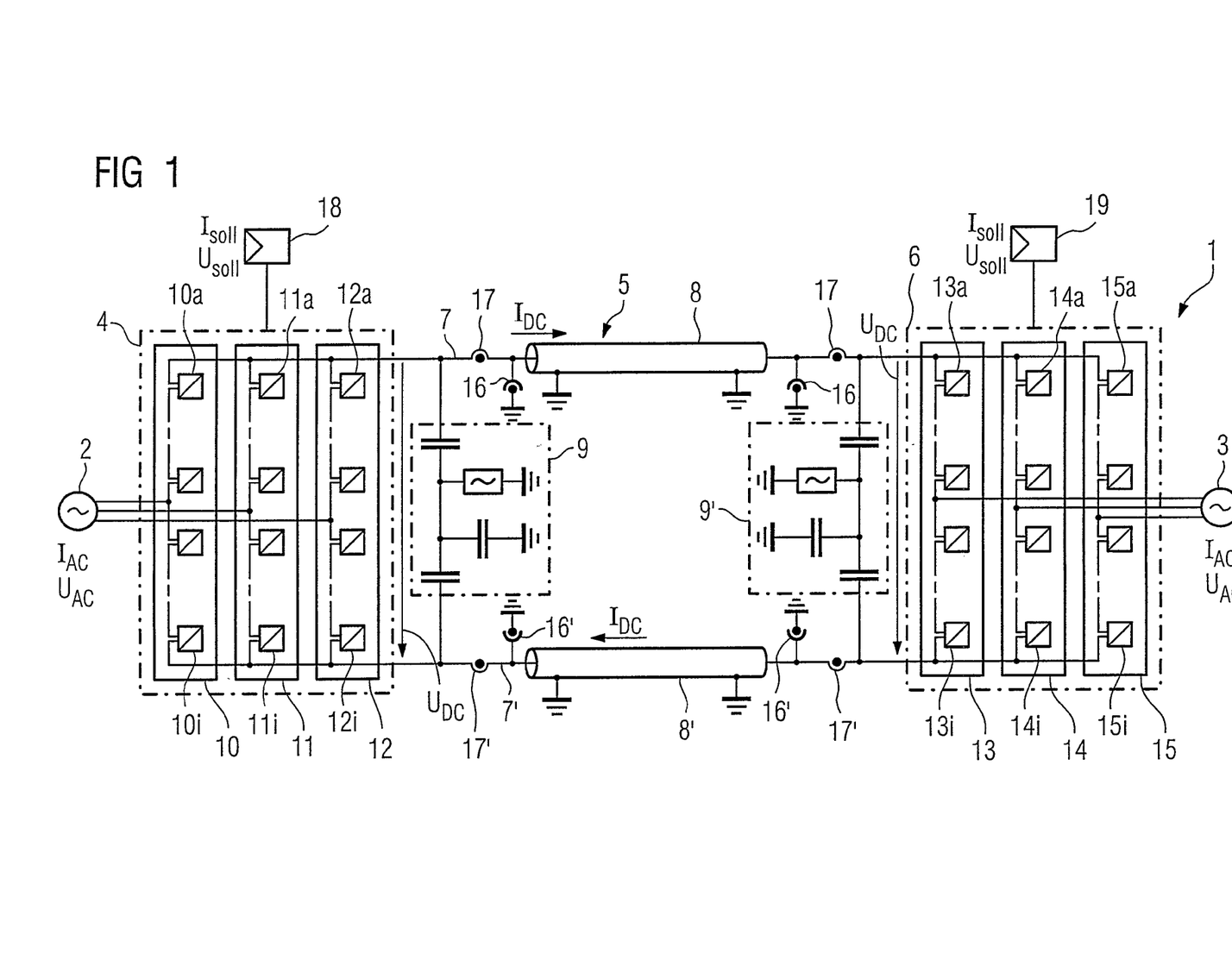
FIG. 1 shows a schematic illustration of one exemplary embodiment of the apparatus according to the invention.

FIG. 1 shows, as an apparatus for electrical power transmission, a high-voltage direct-current long-distance transmission (HVDC) installation 1 for bidirectional power transmission from a transmission system or AC voltage power supply system 2 to some other AC voltage power supply system 3. The AC voltage power supply systems 2 and 3 are in this case connected to the HVDC installation via transformers and/or coils that are not illustrated, or galvanically. The HVDC installation 1 has a first converter 4 as a rectifier to convert the AC voltage to a DC voltage, a transmission cable 5 as a DC voltage line, and a second converter 6 as an inverter to convert the DC voltage to an AC voltage. The bipolar transmission cable 5 has two inner conductors 7, 7' and outer lines 8, 8', which shield the conductors, are grounded at each of their ends, or are protected by other suitable measures, for example suppressors. The first converter 4 has three phase elements 10, 11, 12, each of which has a multiplicity of switching elements $10a \ldots 10i$, $11a \ldots 11i$ and $12a \ldots 12i$ arranged in series. In this case, for balancing reasons, each phase element is connected in the center of the series circuit formed by the switching elements to a respective phase of the AC voltage of the AC voltage power supply system 2. The second converter 6 likewise has three phase elements 13, 14, 15, each having an even number of series-connected switching elements $13a \ldots 13i$, $14a \ldots 14i$, $15a \ldots 15i$, which each have a connection from one phase of an AC voltage power supply system, in the center of the series circuit. At the respective ends of the transmission cable 5, the apparatus also has further circuit arrangements, which are allocated 9 and 9', respectively, comprising capacitors and/or coils and/or resistors and/or suppressors, which are provided for additional smoothing of the DC voltage and for transmission stabilization.

Voltage transformers 16, 16' and current transformers 17, 17' are provided respectively for measuring voltage and current, both in the DC voltage intermediate circuit 5 and in the respective AC voltage power supply systems 2, 3, with the voltage transformers and current transformers on the AC side not being illustrated in the figures, for clarity reasons. The output signals from the voltage transformers 16, 16' and current transformers 17, 17' correspond to the respective high-voltage component measurement variables to be monitored. The recorded variables are, in the end, transmitted as measured vales to control units 18, 19 for the apparatus. The signals are sampled in the control units 18, 19 in order to obtain respectively associated sample values, and the sample values are digitized to produce digital measured values. The measured digitized measurement currents $I_{DC}$ and/or $I_{AC}$ and the measured digitized measurement voltages $U_{DC}$ and/or $U_{AC}$ are respectively compared with predetermined nominal values $I_{nom}$ and $U_{nom}$. Means to provide closed-loop control for the apparatus provide open loop control for the converters 4 and 6 on the basis of open-loop and/or closed-loop control methods.

Further coils, which are not illustrated in the figures, can be arranged between the connections of the respective phase elements 10, 11, 12 as well as 13, 14, 15, or in each case at the central connection of at least one of the respective switching elements $10a \ldots 10i$, $11a \ldots 11i$ and $12a \ldots 12i$ as well as 13a . . . 13i, 14a . . . 14i, 15a . . . 15i. The coils limit any possible circulating current between the phase elements.

Figure 2:
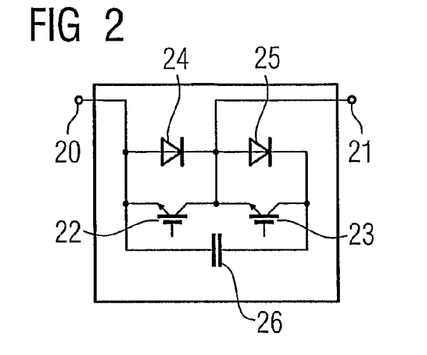
FIG. 2 shows a circuit arrangement of a switching element for the apparatus shown in FIG. 1.
Figure 3:
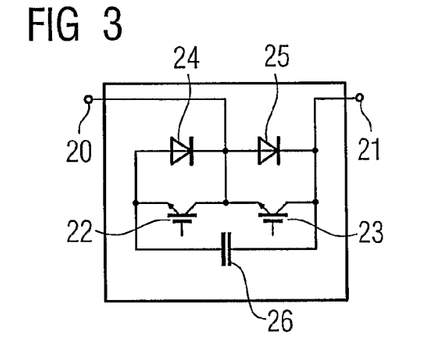
FIG. 3 shows a further exemplary embodiment of a switching element from FIG. 1.

FIGS. 2 and 3 show equivalent circuit arrangements which are known from DE 101 03 031 A1 and are used in the apparatus shown in FIG. 1 as switching elements 10a . . . 10i, 11a . . . 11i, 12a . . . 12i, 13a . . . 13i, 14a . . . 14i, 15a . . . 15i. The switching elements have two connecting terminals 20, 21, two power semiconductors 22, 23, two diodes 24, 25 and a capacitor 26 as the energy storage means. The power semiconductors 22 and 23 in the illustrated example are electronic switches which can be switched off, and in this case IGBTs. However, IGCTs, MOS switching-effect transistors or the like can also be used as power semiconductors. The operation of the circuit arrangement and the series connection of a plurality of such switching elements are described in DE 101 03 031 A1 and, by virtue of this reference, are the subject matter of the present disclosure. The individual switching elements may be designed for the same or different voltage ranges, and, for example, may also be graduated differently, in a binary form or in some other manner. If required, the additional diode, which is not illustrated in the figures and is used to bridge the switching element in the event of a fault, is connected to the connecting terminals 20, 21.

Figure 4:
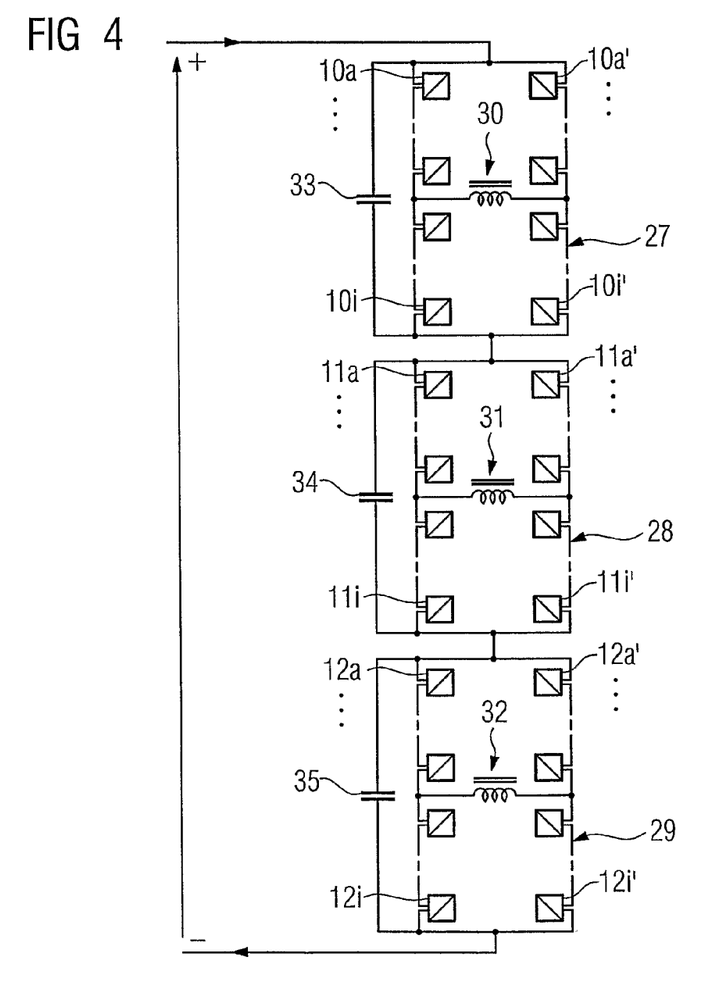
FIG. 4 shows an exemplary schematic illustration of a converter with phase elements of the apparatus according to the invention connected in series.

FIG. 4 shows a further exemplary embodiment of a converter based on a so-called H-circuit for use in an apparatus according to the invention, in which the switching elements 10a . . . 10i and 10a' . . . 10i', 11a . . . 11i and 11a' . . . 11i', 12a . . . 12i and 12a' . . . 12i', respectively, shown in FIG. 2 are arranged for phase elements 27, 28, 29. Each of the phase elements 27, 28, 29 have two parallel branches, each with series-connected switching elements 10a . . . 10i and 10a' . . . 10i', 11a . . . 11i and 11a' . . . 11i', 12a . . . 12i and 12a' . . . 12i'. The parallel branches are each connected to one another via two outer connecting lines, which are shown at the top and bottom of FIG. 4, and a central connecting line, with the same number of switching elements being connected in series between the central and each outer connecting line. The central connecting line in each case has a phase connection 30, 31, 32 for connection to two phases of an applied AC voltage. The phase connections 30, 31, 32 are illustrated schematically as connections on the secondaries of transformers 30, 31, 32, to or from whose primary the respective AC voltage is applied or tapped off. Capacitors 33, 34, 35 are connected in parallel with the respective phase elements 27, 28, 29, which are connected in series with one another. When the illustrated arrangement is operated to produce an AC voltage, each phase element feeds an AC voltage, produced from the DC voltage fed in on the DC voltage side, into one phase of a polyphase AC voltage, by appropriately actuating the individual switching elements. The capacitors 33, 34, 35 are used for additional stabilization and smoothing, and are provided only optionally. This arrangement acts on the principle of a voltage sourced converter, and generates a three-phase AC voltage from the DC voltage applied on the DC voltage side or produced by the converter itself. The arrangement can therefore, of course, also be used as a converter to convert a three-phase AC voltage to a DC voltage, or vice versa.

Figure 5:
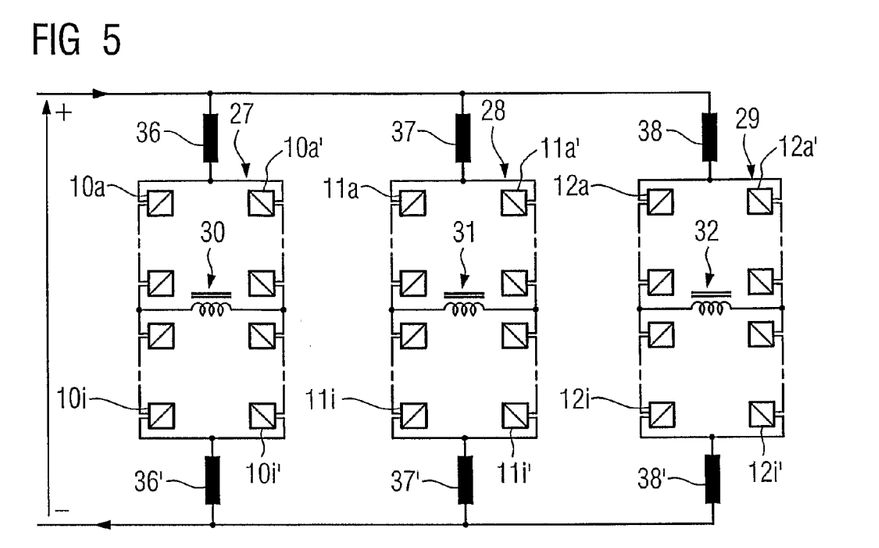
FIG. 5 shows an exemplary schematic illustration of a converter with phase elements of the apparatus according to the invention connected in parallel.

FIG. 5 shows a converter with phase elements 27, 28, 29 connected in parallel which allows higher transmission currents to be achieved than when connected in series as shown in FIG. 4. In this embodiment, by way of example, the phase elements are connected by means of coils 36, 37, 38 and 36', 37', 38' to the bipolar direct-current circuit, to which a transmission line, a cable or a GIL, or any desired combination thereof, can be connected.

Figure 6:
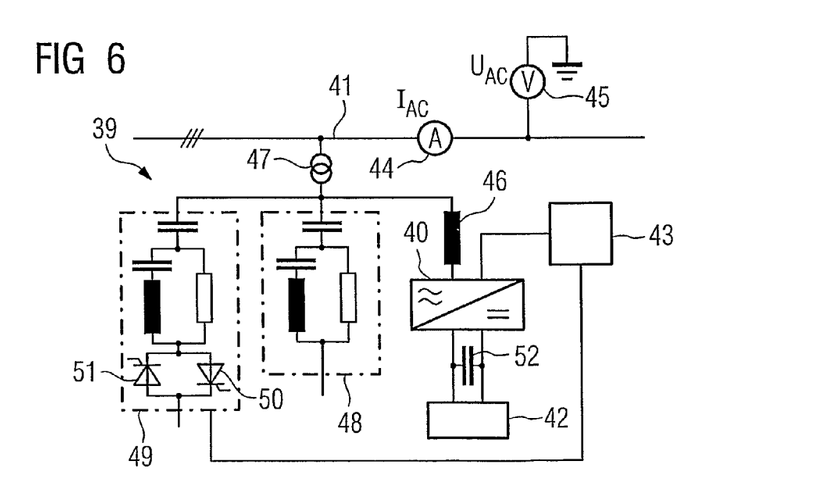
FIG. 6 shows a further exemplary embodiment of the apparatus according to the invention.

FIG. 6 schematically illustrates a further exemplary embodiment according to the invention of an apparatus for electropower transmission 39. The apparatus has a converter 40 which is connected to a transmission line 41 of a transmission system, with the converter 40 being connected on the DC voltage side to a capacitor 52 and to an optional DC voltage source 42. As a transmission system, the transmission line 41 is part of a power supply system with a load connection.

In addition to further means for closed-loop control of the illustrated apparatus according to the invention, an open-loop and closed-loop control unit 43 is used for open-loop and closed-loop control of the converter with a measured alternating current $I_{AC}$ detected by means of a current measurement unit 44 and a measured AC voltage $U_{AC}$, obtained by means of a voltage measurement unit 45, being transmitted to this unit 43, where they are compared with predetermined nominal values in order to provide open-loop control dynamically, and matched in phase, for the AC voltage on the transmission line 41, by means of suitable open-loop control methods. At this point, it should be mentioned once again that the expression AC voltage covers any desired voltage time profiles applied to the transmission line 41 as a transmission system, and is not restricted to sinusoidal or harmonic voltage profiles.

The converter 40 is connected via an optional coil 46, and a likewise optional transformer 47, to the transmission line 41. The converter 40 allows control of the wattless component and/or power, or dynamic control functions such as damping of power oscillations and/or subsynchronous resonances and/or subharmonics and/or super-subharmonics and/or voltage balancing by actively feeding in a voltage whose magnitude and/or phase are/is dynamically variable.

The converter 40 has phase elements, which are not illustrated in the figures, such as the converters 4, 6 illustrated in FIG. 1 and the converters illustrated in FIGS. 4 and 5. Further assemblies for compensation 48, 49 with fixed elements and switchable or controllable power semiconductors 50, 51 are likewise connected to the transmission line 41. The passive components of the assemblies for compensation 48, 49 may comprise any desired combinations of coils, capacitors, resistors and suppressors and/or individual elements thereof. For example, it is advantageous to fit the assembly 49 with a resistor, thus providing a switched or controlled braking resistance for dissipating excess power on the transmission line 41. Excess power such as this can lead to damaging overvoltages on disconnection of loads or HVDC installations which are connected to the transmission line 41.

The assembly 49 advantageously has at least one suppressor. Fitting this suppressor allows a comparable voltage reduction to be achieved. The converter 40 and the assemblies for compensation 48, 49 may be connected to the polyphase transmission line 41 via the transformer 47, via an impedance or else directly. Compensation and control elements such as these are also known per se by the expression FACTS. In the case of the apparatus according to the invention described here, the AC voltage generated in the converter 40 is actively applied to the transmission line 41. The converter 40 which is in this case driven as a function of the transmission requirements so that the signal that is fed in can be matched in a finely graduated form to the transmission requirements. Mechanical switches such as circuit breakers may also be used, instead of the power semiconductors 50, 51. In this case, the apparatus according to the invention may be in the form of such known FACTS, for example in the form of a static synchronous compensator (STATCOM), or in the form of a static synchronous series compensator (S3C) when coupled in series to the transmission line, or in the form of a unified power flow controller (UPFC) when using a combination of parallel and series coupling.

The apparatuses illustrated in FIGS. 1, 4, 5 and 6 may also, within the scope of the invention, be connected to single-phase, two-phase or polyphase AC power supply systems and transmission lines using respective expedient connecting means, in contrast to the illustrated three-phase AC voltage power supply systems and the three-phase transmission line 41.

Furthermore, the apparatus shown in FIG. 1, both in the form of the bridge circuit illustrated there and in the variant with converters forming an H circuit as shown in FIGS. 4, 5, is particularly suitable for the known HVDC multiterminal operation, that is to say for high-voltage direct-current transmission with three or more converters, in which case the converters are connected to one another by means of a transmission line, which is in the form of a cable or a gas-insulated transmission line, or else directly forming a so-called back-to-back link.

The capacitors in the circuit arrangement 9, 9' shown in FIG. 1, the capacitors 26 shown in FIGS. 2 and 3, the capacitors 33, 34, 35 shown in FIG. 4 and the capacitors in FIG. 6, including the capacitor 52, may be combined as required with energy stores such as a flywheel, batteries, supercaps or the like, or may be replaced by these energy stores. For this purpose, the energy stores are arranged in parallel with, or instead of, the said capacitors. A spatially concentrated arrangement in a common assembly, for example in the circuit arrangement 9, as well as a distributed arrangement of the energy stores, that is to say a spatial splitting between different components, are also possible.

LIST OF REFERENCE SYMBOLS

1 HVDC installation
2, 3 AC voltage power supply systems
4 First converter
5 Transmission cable
6 Second converter
7, 7' Inner conductor
8, 8' Outer conductor
9, 9' Circuit arrangement
10, 11, 12 Phase elements
10a . . . 10i Switching elements
11a . . . 11i Switching elements
12a . . . 12i Switching elements
10a' . . . 10i' Switching elements
11a' . . . 11i' Switching elements
12a' . . . 12i' Switching elements
13, 14, 15 Phase elements
13a . . . 13i Switching elements
14a . . . 14i Switching elements
15a . . . 15i Switching elements
16, 16' Voltage transformer
17, 17' Current transformer
18, 19 Control unit
20, 21 Connections
22, 23 Power semiconductor
24, 25 Diodes
26 Capacitor
27, 28, 29 Phase elements
30, 31, 32 Phase connections
33, 34, 35 Capacitors
36, 37, 38 Coils
36', 37', 38' Coils
39 System for electrical power transmission
40 Converter
41 Transmission line
42 Energy storage means
43 Open-loop and closed-loop control unit
44 Current measurement unit
45 Voltage measurement unit
46 Coil
47 Transformer
48, 49 Compensation assemblies
50, 51 Thyristors
52 Capacitor

The invention claimed is:

1. An apparatus for electrical power transmission, comprising:
at least one converter having phase elements, each of said phase elements including an assembly of switching elements, each of said switching elements having at least two switchable power semiconductors and at least two freewheeling diodes, respectively connected in parallel with said power semiconductors, and each of said switching elements having energy storage means;
controller means for closed-loop control of said at least one converter such that at least one of the following is controlled:
a zero crossing phase angle, an amplitude, and/or instantaneous values of an AC voltage of a transmission system to be connected to the apparatus; and/or
a DC voltage and a direct current on a DC voltage line connecting said at least one converter to a DC voltage source; and/or
a DC voltage and a direct current of at least three converters that are connected to one another.

2. The apparatus according to claim 1, wherein said switching elements of one said phase element are connected in series, said switching elements are an even number of said switching elements, and a load connection or power supply system is disposed centrally on the series circuit formed by said series-connected switching elements.

3. The apparatus according to claim 1, wherein each of said phase elements has two parallel branches each having an even number of switching elements connected in series.

4. The apparatus according to claim 3, which comprises a transformer winding connecting at least said two parallel branches.

5. The apparatus according to claim 3, which comprises a parallel branch connection galvanically connecting at least two parallel branches.

6. The apparatus according to claim 1, wherein a plurality of said phase elements of a converter are connected in parallel with one another.

7. The apparatus according to claim 1, wherein a plurality of said phase elements are connected in series with one another.

8. The apparatus according to claim 1, which comprises energy storage means connected in parallel with said phase elements.

9. The apparatus according to claim 1, wherein each said phase element includes at least one impedance, or is connected to a respectively other phase element via an impedance.

10. The apparatus according to claim 1, wherein said at least one converter is connected in parallel with the transmission system or with the DC voltage line.

11. The apparatus according to claim 1, wherein said at least one converter is connected in series with the transmission system or the DC voltage line.

12. The apparatus according to claim 1, wherein said DC voltage source is a converter.

13. The apparatus according to claim 1, wherein, at least in places, the DC voltage line is at least one line selected from the group consisting of a gas-insulated transmission line, a cable, and an overhead line.

14. The apparatus according to claim 1, wherein said at least one converter has line-commutated power semiconductors.

15. The apparatus according to claim 1, wherein the DC voltage line has one or two poles.

16. The apparatus according to claim 1, wherein said DC voltage line is an impedance.

17. The apparatus according to claim 1, which comprises at least one further diode connected in parallel with said switching elements.

18. The apparatus according to claim 1, wherein said transmission system has one or more phases.

19. The apparatus according to claim 1, wherein said energy storage means comprise one or more capacitors.

20. The apparatus according to claim 1, wherein said at least one converter is connected to the DC voltage line by way of an energy storage device.

21. The apparatus according to claim 1, wherein said at least one converter is one of three converters each connected to the DC voltage line by way of a respective energy storage device.

22. A system, comprising an apparatus according to claim 1 and a transmission system connected to said apparatus and configured to have at least one phase and to carry an alternating current.

23. The apparatus according to claim 1, wherein said controller means controls the zero crossing phase angle, the amplitude, and/or instantaneous values of the AC voltage of a transmission system connected to the apparatus.

* * * * *